(12) United States Patent
Fridley et al.

(10) Patent No.: US 7,267,540 B2
(45) Date of Patent: Sep. 11, 2007

(54) STEEP ANGLE CUTTER HUB WITH BLUNT EDGE BLADES

(75) Inventors: Michael A. Fridley, Eagle Rock, VA (US); J. Wayne Martin, Buchanan, VA (US); Tsung (Daniel) Cheng Chang, Taichung (TW)

(73) Assignee: Gala Industries, Inc., Eagle Rock, VA (US)

( * ) Notice: Subject to any disclaimer, the term of this patent is extended or adjusted under 35 U.S.C. 154(b) by 43 days.

(21) Appl. No.: 11/339,848

(22) Filed: Jan. 26, 2006

(65) Prior Publication Data

US 2007/0172535 A1   Jul. 26, 2007

(51) Int. Cl.
*B29B 9/10* (2006.01)
(52) U.S. Cl. .......................... 425/313; 425/311; 425/67
(58) Field of Classification Search .................. 425/67, 425/311, 313
See application file for complete search history.

(56) References Cited

U.S. PATENT DOCUMENTS

| | | | |
|---|---|---|---|
| 3,070,835 A * | 1/1963 | Alsys | ........................ 264/14 |
| 4,123,207 A | 10/1978 | Dudley | |
| 4,251,198 A | 2/1981 | Altenburg | |
| 4,728,276 A | 3/1988 | Pauley et al. | |
| 5,059,103 A | 10/1991 | Bruckmann et al. | |
| 6,832,738 B2 | 12/2004 | Wessling | |
| 2004/0009254 A1 | 1/2004 | Eloo et al | |
| 2005/0079240 A1* | 4/2005 | Albonetti et al. | ........... 425/311 |
| 2005/0220920 A1 | 10/2005 | Fridley | |

* cited by examiner

*Primary Examiner*—Robert Davis
*Assistant Examiner*—Marissa W. Chaet
(74) *Attorney, Agent, or Firm*—Jacobson Holman PLLC (57) ABSTRACT

A cutter hub and blade assembly for cutting polymer strands extruded from a die face in a pelletizer has cutter blades mounted on the cutter hub at a steep angle. The blades are beveled along a portion of their leading edge to form a blunt cutting edge or surface to the blades which is generally perpendicular to the die face. By beveling the leading edge of a blade supported at a steep angle to form a blunt cutting edge, the bottom surface area of the blade in contact with the die face can be significantly reduced. The reduced contact area provides several advantages including a clean cut of the pellets and a faster blade grinding when seating the blades to the die face.

20 Claims, 10 Drawing Sheets

STEEP ANGLE CUTTER HUB WITH BLUNT EDGE BLADES

BACKGROUND OF THE INVENTION

1. Field of the Invention

The present invention relates generally to a rotating cutter hub and blade assembly used in a pelletizer in which a molten polymer is extruded as strands through orifices in a die plate and the strands are cut into pellets with the cutter blades. In this invention, the cutter blades are generally parallelepiped in cross-section and are mounted on the cutter hub at a steep angle to the die face. The front side or leading edge surface of each blade is beveled to present a blunt, generally perpendicular leading or cutting edge or surface to contact and shear the extruded strands along the die face.

2. Description of the Prior Art

The use of a cutter hub with a plurality of blades mounted thereon in association with the die face of a die plate in an underwater and other pelletizers is well known. U.S. Pat. No. 4,123,207 discloses initial developments of a cutter hub supporting a plurality of replaceable cutter blades having a cutting edge associated with the die face of an underwater pelletizer to cut extruded strands of polymer into pellets in which the cutter hub is supported and rotated by a drive shaft with the die face, cutter hub and associated blades being oriented in a water box. Various subsequently issued patents disclose similar pelletizing structures.

Figures 11A, 11B:
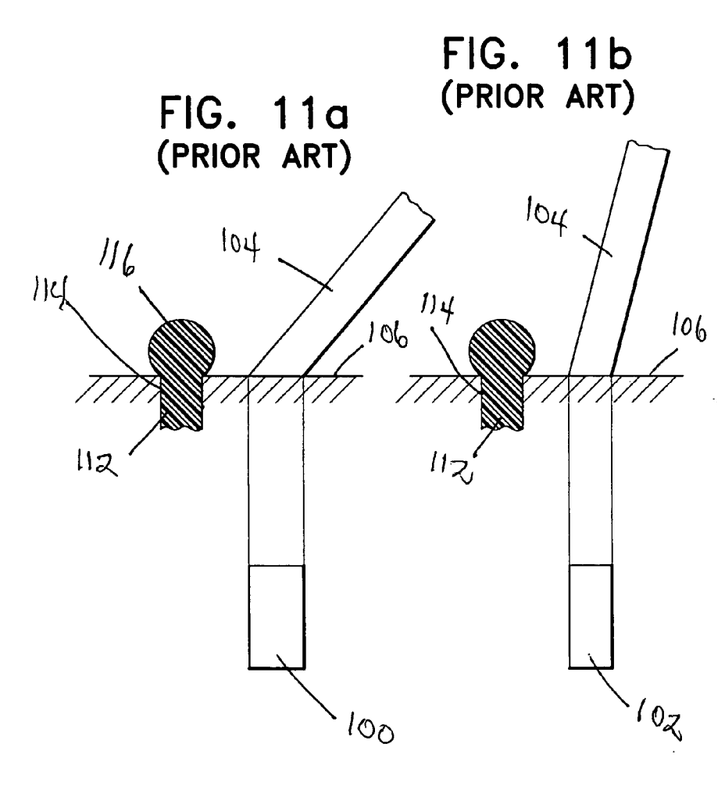
FIGS. 11a-11d comparatively illustrate the differences in relation between prior art blades, shown in FIGS. 11a-11c, and the first embodiment of cutter blades in accordance with the present invention, shown in FIG. 11d.

Cutter blades of a rectangular configuration having oppositely inclined cutting edges are commercially available in which the inclination of the opposing blade cutting edge is about 49° to the die face, as illustrated in FIG. 11a. Inclined cutting edges are typically formed on opposite end edges of the blades to enable both end edges to serve as cutting edges in association with the die face of the pelletizer. Blades of this type are mounted on cutter hub arms to support the blades in standardized angular positions with respect to the die face of the underwater pelletizer.

Figure 11C:
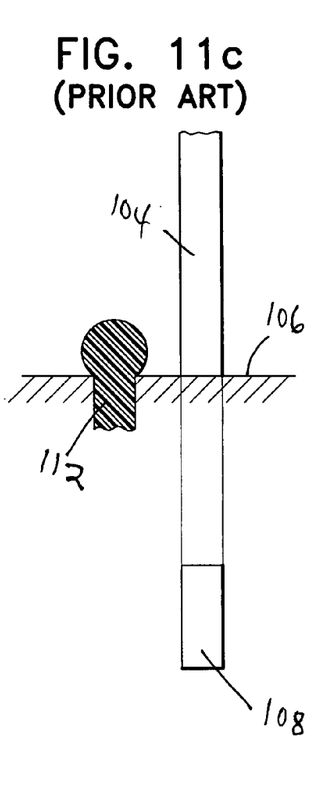

Steep angle cutter hub and blade assemblies with the cutting blades mounted at a preferred angle of about 75° to the die face are disclosed in published U.S. Patent Application No. US 2005-0220920-A1, owned by the assignee of the instant application, and the disclosure of which is expressly incorporated by reference in this specification as if fully set forth herein in its entirety. Published U.S. Patent Application No. US 2003-0102395-A1 also discloses an underwater pelletizer cutter hub with separator bodies or cutting blades mounted on the arms in a generally perpendicular relation to the die face. In this publication, the impact slats or separator bodies can be chamfered on their edge pointing toward the cutoff head. These two prior art configurations are illustrated in FIGS. 11b and 11c, respectively, of the drawings.

These prior art structures, however, fail to provide a cutter hub and blade assembly for a pelletizer in which the cutter blades have a bottom surface contact area that can be adjusted and reduced regardless of blade thickness, that can provide a blunt or generally perpendicular leading edge to shear the extruding strands into pellets, that can be used on existing cutter hubs, and that can more readily seat against the die face, especially already used and slightly worn die faces.

SUMMARY OF THE INVENTION

In order to overcome the above drawbacks of the prior art, the cutter hub and blunt edge blade assembly of the present invention includes a cutter hub with a plurality of circumferentially spaced support arms radiating outwardly from a hub that is secured to the drive shaft. Each cutter hub arm supports a generally rectangular blade (in plan view) at a steep angle to the die face, and each blade has at least one end forming a blunt cutting edge or surface. The blades include opposed parallel, planar surfaces to form a leading or front side and a trailing or back side to each blade. The side edges are preferably perpendicular to the planar surfaces. The leading or front side of each blade is beveled at an angle to form a generally perpendicular leading blunt edge or surface at the cutting edge of the blade. In a first embodiment of the invention, the blade end edge has a bottom surface contact area which is parallel to the die face extrusion surface. In a second embodiment of the invention, the trailing or back side of the blade edge is also beveled to thus form a narrow tip blunt edge to the cutter blade.

The cutter hub arms supporting the blades at a steep angle relative to the die face most preferably support the blades at a blade support angle of about 75°. The beveled angle between the leading or front side planar surface of the cutting blade and the blunt leading edge or surface of the cutting blade is preferably about 15°. The about 75° blade support angle and about 15° beveled angle thus orient the blunt leading edge or surface of the cutter blade as it approaches an extruded strand in a plane approximately perpendicular to the die face. As such, the present invention provides a blunt leading edge or surface for the cutting edge of the cutter blades which is approximately 90° to the die face (the "blunt edge angle"), while at the same time providing a construction in which the bottom surface contact area can be adjusted and reduced regardless of blade thickness. The about 75° cutter blade support angle also allows the blades of the present invention to be used with the cutter hub of the aforementioned published U.S. Patent Application No. 2005/0220920 A1, without the need for a separate cutter hub.

The beveled portion or blunt leading edge surface of the cutter blades of this invention should extend up a substantial height or length of the blade, at least 10% and preferably 15% to 35%, depending on the blade support angle. With the preferred 75° blade support angle the height of the blunt leading edge surface is about 25% of the length of the blade.

The blunt edge blades of the present invention are easier and quicker to grind and seat to the die face because the bottom surface contact area can be adjusted and reduced as desired for the extrudate being pelletized. Further, the narrow tip edge second blade embodiment of the present invention provides for more rapid seating of new blades to the face of the die plate since only a very small area of the cutting edge or tip end of the cutting blade initially engages the die face.

While the support angle of the cutting blades on the cutter hub in accordance with the present invention is most preferably about 75°, the support angle can vary from as low as 60° to as high as 79°, preferably about 72° to about 76°. The beveled angle should be equal to 90° less the support angle in order to produce a generally perpendicular blunt leading edge or surface. Hence, the beveled angle can vary between about 11° and about 30°, preferably between about 14° and about 18°, and most preferably is about 15°. The blunt edge angle can also vary slightly from 90°, but should not be less than 85° nor more than 95°.

The beveled or blunt leading edge for the cutter blades in accordance with the present invention should reduce the bottom surface contact area by at least 25% from the comparative cross-sectional area of the blade, and preferably about 50% to about 75%, and more in the embodiment with the trailing or back side of the blade also beveled to form the narrow tip edge cutter blade. Such reduction in contact area facilitates grinding and seating of the blade edge onto the die face, reduces smearing of the extrudate during the cutting action, and reduces potential for fines formation.

It is therefore an object of the present invention to provide a cutter hub and blade assembly for pelletizers, especially underwater pelletizers, in which the cutting blades are supported at a steep angle in the cutter hub and are beveled at a lower portion of the front side to form a blunt leading edge or surface which is generally perpendicular to the die face.

A further object of the present invention is to provide a cutter hub and blade assembly in accordance with the preceding object in which the blades have a rectangular configuration in plan view and parallelepiped configuration in cross-section with the two end edges of the blade oppositely beveled to provide two blunt cutting edges on the blade, thus enabling the blade to be reversed and used in two cutting cycles before replacement.

Another object of the present invention is to provide a cutting blade in accordance with the preceding objects which has a bottom surface contact area of the cutter blade which can be adjusted and reduced regardless of blade thickness, as desired, depending upon the pelletizer application.

Yet a further object of the present invention is to provide a cutting blade in accordance with the preceding objects which can be used on existing cutter hubs, such as disclosed in the aforementioned published U.S. Patent Application No. US 2005-0220920-A1, without the necessity for a separate cutter hub, and thereby provide a cutter hub and blade assembly with an angled cutting edge as disclosed in the aforesaid application or a perpendicular cutting edge as disclosed in the present application.

A still further object of the present invention is to provide a cutting blade in accordance with the preceding objects which will more readily grind and seat against the die face, especially against already used and/or slightly worn die faces.

Still another object of the present invention is to provide a cutter hub and blade assembly in which the blunt cutting edge of the blades does not completely cover the extrusion orifice in the die plate so as to reduce the formation of fines attached to the pellets that can separate from the pellets during subsequent processing.

Yet another object of the present invention is to provide a cutter hub and blade assembly in accordance with the preceding objects in which the cutting blades in one embodiment have a reduced bottom surface contact area parallel to the die face of at least 25% less than the comparative cross-sectional area of the blade, and preferably a reduction of about 50% to about 75%.

Still yet another object of the present invention is to provide a cutter hub and blade assembly in accordance with the preceding objects in which the blunt cutting edge of the blades in another embodiment is also beveled along the trailing or back side to form a narrow tip edge to the cutter blade.

A final object of the present invention to be set forth herein is to provide a cutter hub and blade assembly for underwater pelletizers in accordance with the preceding objects, which can be easily manufactured from readily available and known components for ease and economy of manufacture and which will be sturdy and long lasting in operation and use.

While the present invention is described primarily for underwater pelletizers which is its preferred application, those skilled in the art will recognize that this invention is applicable to all face-cut pelletizers, including but not limited to dry-face, air knife and water-ring pelletizers. As such, it is intended that this invention be equally applicable to all face-cut pelletizers.

These together with other objects and advantages which will become subsequently apparent reside in the details of constructions and operation as more fully hereinafter described and claimed, reference being had to the accompanying drawings forming a part hereof, wherein like numerals refer to like parts throughout. The drawings are intended only to illustrate the present invention and should not be considered to scale.

DETAILED DESCRIPTION OF THE PREFERRED EMBODIMENTS

The foregoing description and drawings should be considered as illustrative only of the principles of the invention. Numerous applications of the present invention will readily occur to those skilled in the art. Therefore, it is not desired to limit the invention to the preferred embodiment or the exact construction and operation of the preferred embodiment shown and described. Rather, all suitable modifications and equivalents may be resorted to, falling within the scope of the invention.

Figure 1:
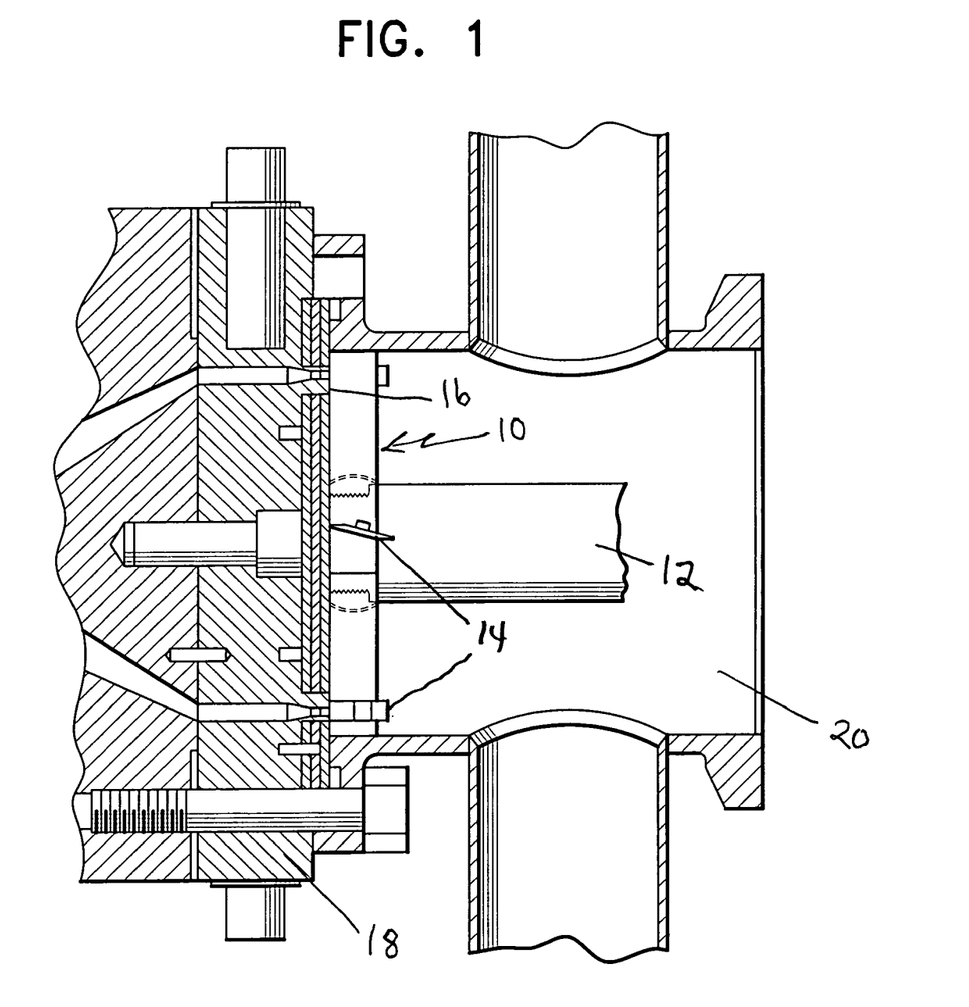
FIG. 1 is a fragmental sectional view illustrating a representative cutter hub and blade assembly in accordance with the present invention associated with a typical die plate of an underwater pelletizer.

A cutter hub and blade assembly applicable for the present invention is generally designated by reference numeral 10 and illustrated in its manner of use in FIG. 1. Such overall structure is more specifically disclosed in U.S. Pat. Nos. 4,123,207 and 4,251,198 with such disclosures expressly being incorporated by reference in this specification as if fully set forth herein in their entirety. The underwater pelletizer includes a drive shaft 12 for driving the cutter hub and blade assembly 10 about the axis of the shaft 12 so that cutter blades 14 move along the face 16 of a die plate 18 within a water box 20 in a manner well known in the art.

Figure 2:
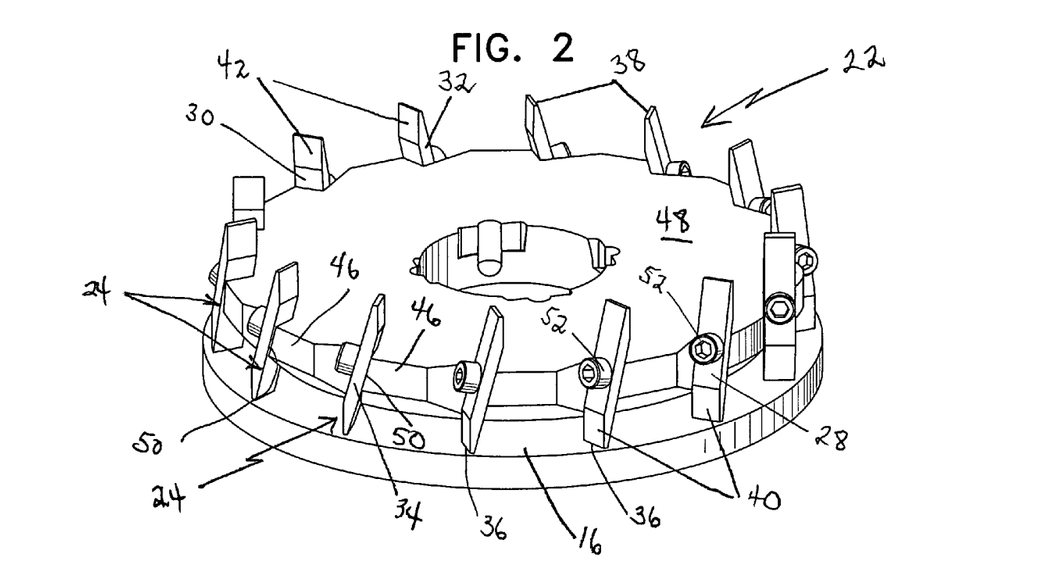
FIG. 2 is a perspective view of a first embodiment of a cutter hub and cutter blades in accordance with the present invention, illustrating the association of the blades with the cutter hub and die face.
Figure 3:
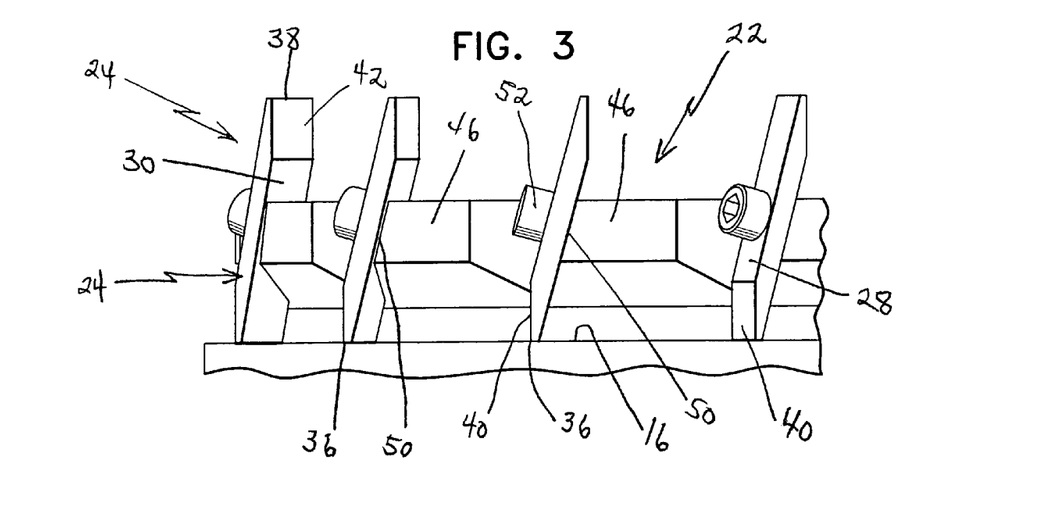
FIG. 3 is a side view, on an enlarged scale, of the cutter hub and blades illustrated in FIG. 2.
Figure 6:
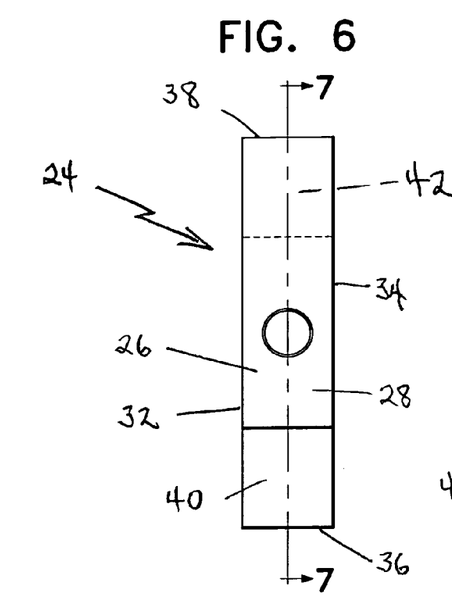
FIG. 6 is a frontal view of the cutting blade of the first embodiment in accordance with the present invention.
Figure 7:
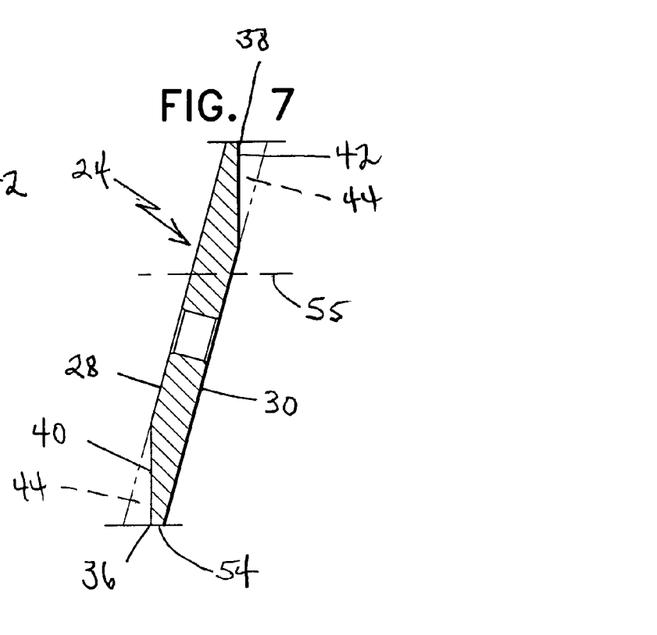
FIG. 7 is a longitudinal sectional view taken along section line 7-7 in FIG. 6, illustrating the steep blade support angle and blunt leading edge on the cutting blade of the first embodiment.

A first embodiment of the cutter hub and blade assembly of the present invention is illustrated in FIGS. 2 and 3 and generally designated by reference numeral 22. The blades of the first embodiment are generally designated by reference numeral 24 and are illustrated in detail in FIGS. 6 and 7. As illustrated in FIGS. 6 and 7, each cutter blade 24 of this invention includes a rectangular rigid metal body 26 having parallel opposed front, or leading, and rear, or trailing, planar surfaces 28 and 30, respectively, and parallel side edges 32 and 34 which also are parallel to each other. The cutting edges, generally designated by reference numerals 36 and 38, are beveled to form blunt leading surfaces 40 and 42 by removing triangular sections 44 from an otherwise parallelepiped configuration. Each cutting blade 24 is supported from a support arm 46 rigid with the cutter hub 48, and each support arm 46 is provided with an inclined surface 50 against which the planar surface 30 is engaged so that the cutting edge 36 engages the die face 16. A fastener, such as capscrew 52, threaded into the support arm 46 secures the blade 24 in position with the blunt cutting edge 36 engaging the die face 16.

When the blunt cutting edge 36 of the blades 24 become sufficiently worn, the bolts 52 can be removed and the blades 24 reversed. When reversed, the planar surface 28 is in contact with and supported by arm surface 50 so that unused blunt cutting edge 38 engages the die face 16. Thus, having blunt cutting edges 36 and 38 at each end of blades 24 effectively doubles the useful life of each blade.

As shown in FIGS. 2 and 3, the blade 24 is supported in cutter hub arm 46 at a steep angle defined by the slope or angle of the inclined surface 50. This support angle defined by the inclined surface 50 can vary from as low as 60° to as high as 79°, preferably about 72° to about 76°, and most preferably about 75°, which is the support angle shown in FIGS. 2 and 3. The beveled surfaces 40 and 42 should be at a beveled angle equal to 90° less the support angle in order to produce generally perpendicular blunt leading edges, as best illustrated in FIG. 7. Hence, the beveled angle can vary between about 11° and about 30°, preferably about 14° to about 18°, and most preferably about 15°, as shown in FIG. 7. While a blunt edge angle of 90° with blunt surfaces 40 and 42 perpendicular to the die face is preferred, some variation can be tolerated up to ±5° in either direction.

Also as best shown in FIG. 7, the beveled or blunt edge 36 for the cutter blades 24 of the present invention should have a reduced bottom surface contact area 54 which is at least 25% less than the comparative cross-sectional area of the blade, and preferably about 50% to about 75% less. The comparative cross-sectional area of the blade is measured by a plane parallel to the bottom surface 54 and passing through the cross-section of the blade between beveled surfaces 40 and 42, such as illustrated by broken line 55 in FIG. 7. This reduction in contact area facilitates grinding and seating of the blade cutting edges 36 and 38 onto the die face 16 and reduces potential smearing of the extrudate during the cutting action. It also reduces potential for fines formation, as described hereinafter.

The blunt leading surfaces 40 and 42 each extend over a substantial portion of the height or length of the blade as shown in FIGS. 6 and 7. This portion should be at least 10% of the blade's length, and preferably about 15% to about 35%, depending upon the blade support angle in order to ensure sufficient reduction in the bottom surface contact area described above. With the preferred blade support angle of about 75° and preferred beveled angle of about 15°, the height of the blunt leading surfaces 40 and 42 is about 25% of the length of the blade.

Figure 4:
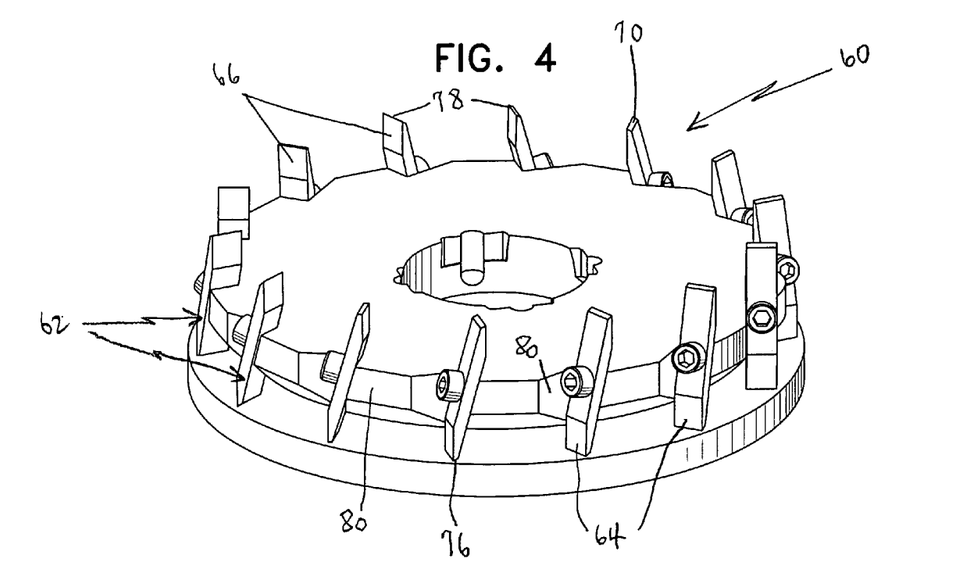
FIG. 4 is a perspective view of a second embodiment of a cutter hub and cutter blades in accordance with the present invention, similar to FIG. 2 for the first embodiment.
Figure 5:
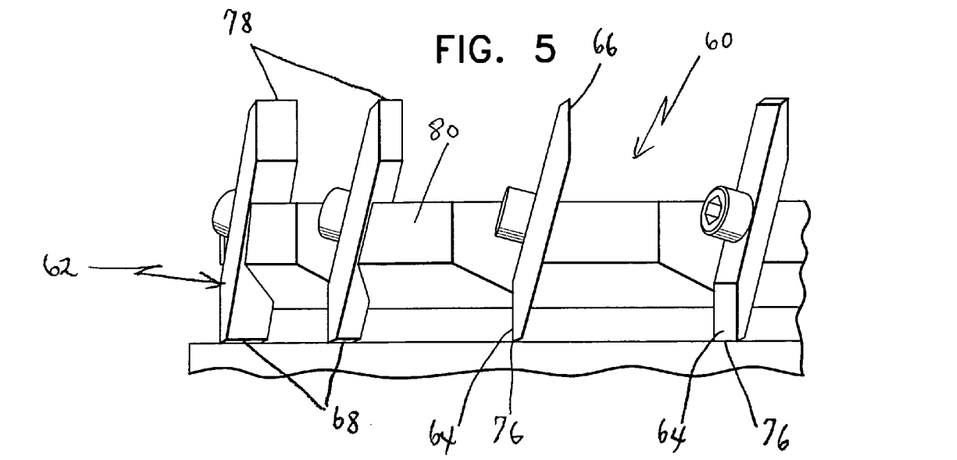
FIG. 5 is a side view, on an enlarged scale, of the cutter hub and blades illustrated in FIG. 4.
Figure 8:
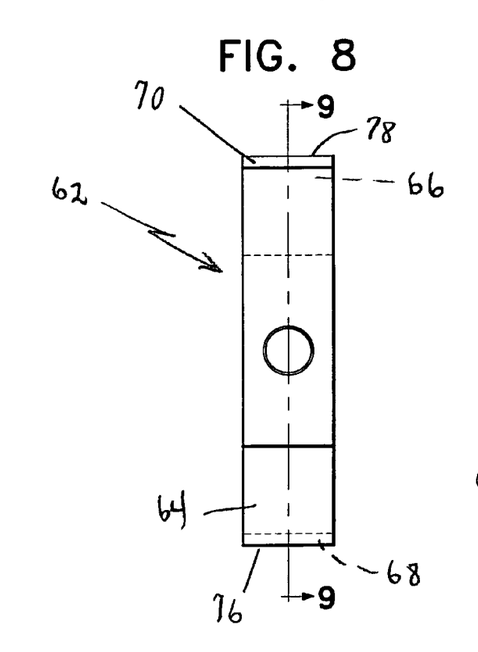
FIG. 8 is a frontal view of the cutting blade of the second embodiment in accordance with the present invention.
Figure 9:
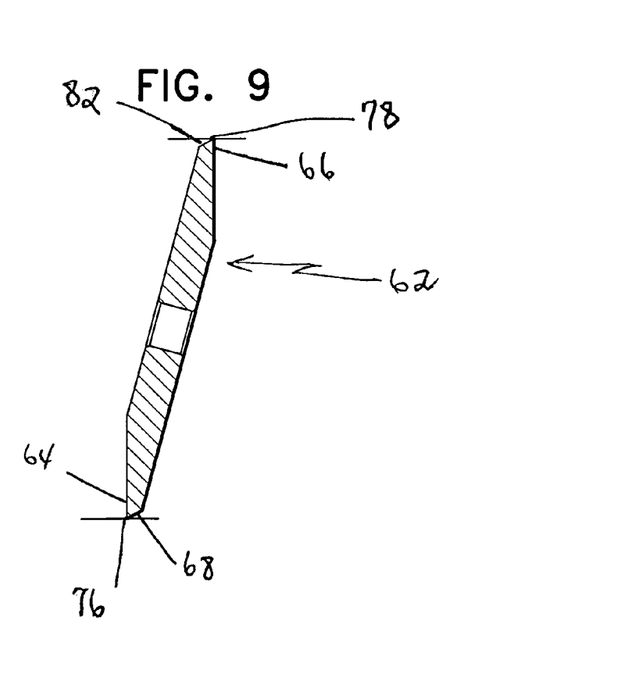
FIG. 9 is a longitudinal sectional view taken along section line 9-9 in FIG. 8, illustrating the steep blade support angle and blunt leading edge on the cutting blade of the second embodiment.

A second embodiment of the cutter hub and blade assembly of the present invention is illustrated in FIGS. 4 and 5 and generally designated by reference numeral 60. The blades of the second embodiment are generally designated by reference numeral 62 and are illustrated in detail in FIGS. 8 and 9. As illustrated in FIGS. 8 and 9, each cutter blade 62 of the second embodiment is essentially identical to cutter blade 24 of the first embodiment except that the rear or trailing portion of the blunt cutting edges 64 and 66 are also beveled or cut away as at 68 and 70 to form narrow cutting edges in the form of sharp tips 76 and 78 on the opposite ends of the cutting blade 62 as shown in FIG. 9. The blades 62 of the second embodiment are reversible in the same manner as described above for the blades 24 of the first embodiment.

Also, as in the first embodiment, the cutter blades 62 of the second embodiment are supported in support arms 80 at an inclined support angle from 60° to 79°, preferably about 72° to about 76°, and most preferably about 75°. The beveled angle of the leading edge of the second embodiment cutter blade is the same as in the first embodiment so as to provide a blunt leading edge or surface to the cutter blade which addresses the extruded strands substantially perpendicular to the die face or at an about 90° angle. The angle 82 between the cutaway portion of the trailing edge and the die face should preferably be at least 10° so as to provide the requisite clearance and no more than about 40°, and preferably between about 14° to about 34°, most preferably about 30°, depending upon the beveled angle of the blunt leading edge 64 and 66.

Figure 10:
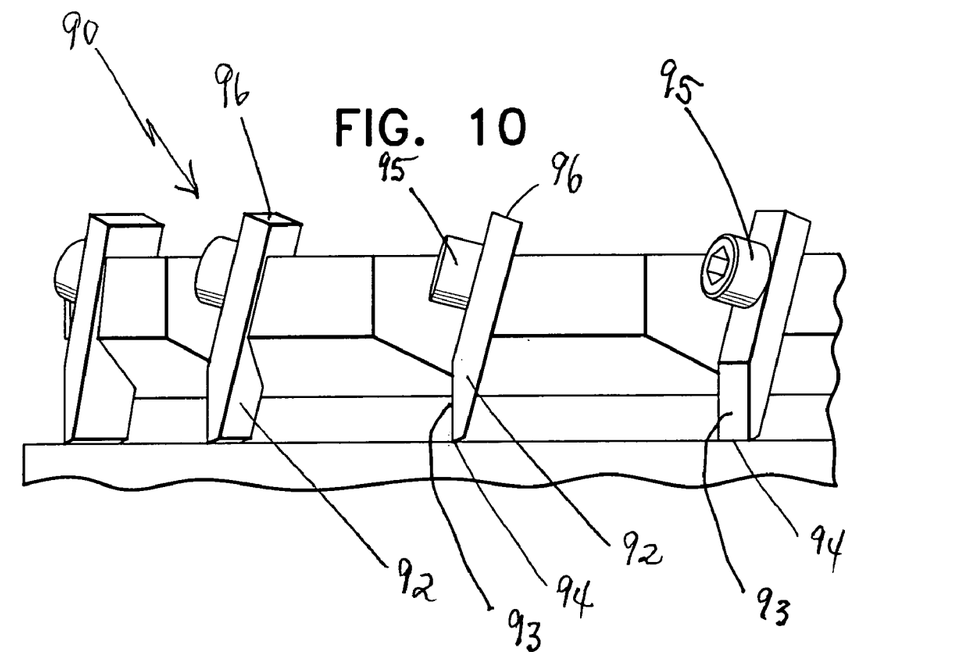
FIG. 10 is similar to FIG. 5, illustrating a cutter hub and cutting blades in accordance with the second embodiment of the present invention but having a blunt cutting edge on only one end of each blade.

The cutter hub and blade assemblies of the present invention can be provided with blades only about one-half in length and without the reversible second cutting edge. This is illustrated by the cutter hub and blade assembly 90 shown in FIG. 10 wherein the blades 92 have a cutting edge 94 but are cut off at the top at 96 to provide a substantially shortened height. By providing a shortened blade height, the cutter hub and blade assembly 90 shown in FIG. 10 is more aerodynamic within the water in the water box 20, thus reducing the load on the motor that drives shaft 12 and the water turbulence or cavitation in the water box 20.

It will also be obvious to those skilled in the art that when the cutter blades 92 have only about one-half length, compared to the double-edged blades described previously, such as blades 24 and 62, the percentage of the blade height or length of the leading edge or surface 93 can be significantly higher, almost double, than described earlier. Thus, the blunt leading surface 93 should be at least 20% of the height of blades 92, preferably about 25% to about 60%, and most preferably about 40%, to take into account the slight extra height to accommodate capscrew 95.

The prior art as illustrated in FIGS. 11a-11c, demonstrates a relationship between the blade angle and the bottom surface contact area of the blade against the die face. FIGS. 11a and 11b illustrate a reduction of bottom surface contact area represented by rectangle 100 and 102 due to changing the angle of the blade 104 in relation to the die face from 49° (FIG. 11a) to 75° (FIG. 11b). The bottom surface area can be reduced further as in rectangle 108 by increasing the blade angle to 90° as illustrated in FIG. 11c. However, further reduction is minimal.

Figure 14:
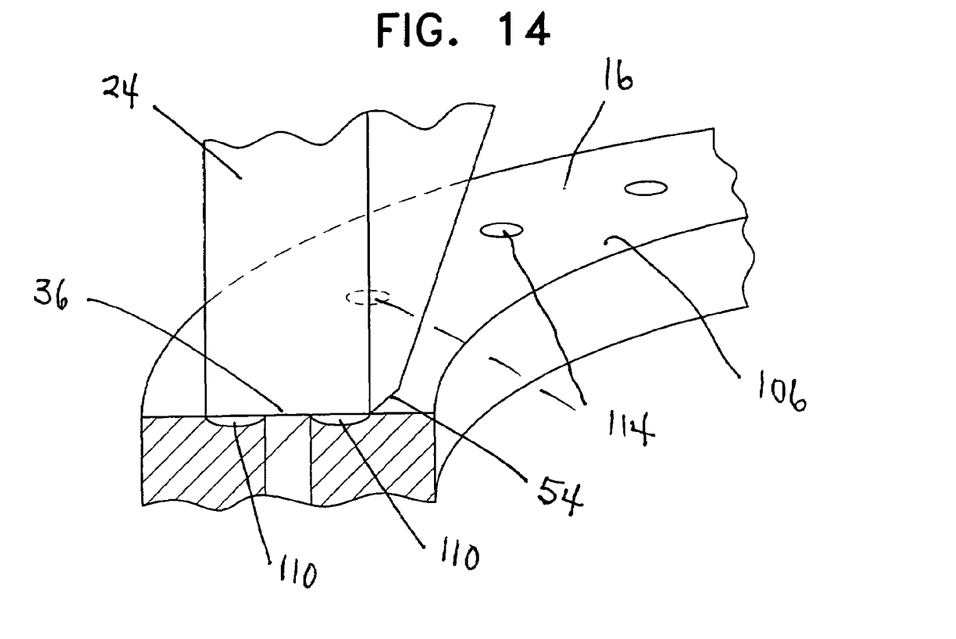
FIG. 14 is a fragmental perspective view of the first embodiment cutting blade of the present invention being seated with respect to a die face having grooves worn therein.
Figure 15:
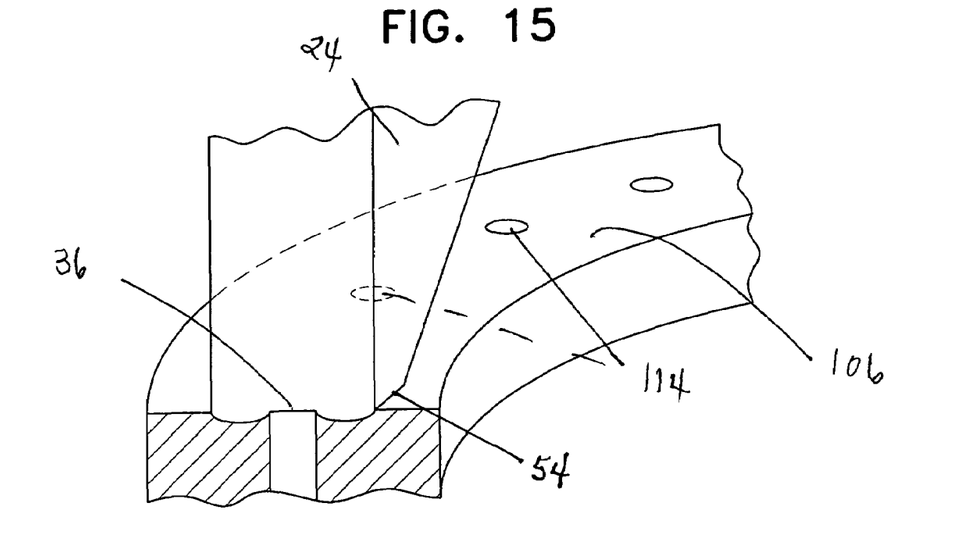
FIG. 15 is a perspective view similar to FIG. 14 illustrating the cutting blade seated into the grooves in the die face.

It is known in underwater pelletizing that as new blades are installed they normally are first "seated" in relationship to the die face. This procedure of "seating" is not critical as long as the die face is perfectly flat, like new condition, but in most cases it is necessary to "seat" the blades on a die face that has been in operation for a much longer period of time than the cutter blades and as a result has some grooves 110 due to wear (as shown in FIGS. 14 and 15). The wear on the die face 16 occurs as a result of the abrasive nature of the polymer strands 112 (see FIGS. 11a-11d, for example) exiting out of the die holes 114 and being sheared and or smeared across the surface 106 of the die face 16. This abrasion also occurs on the blunt cutting edge 36 of the blade 24 which first impacts the polymer strand 112 and begins the process of shearing the strand 112 into a pellet 116. In addition, the strand 112 abrades the bottom cutting edge 36 of the blade 24. This effect will dull the front side of the blade 24 and grooves the blade, in effect, creating the gap 110 between the bottom edge of a new blade and the die face 16. As the blades continue to run shearing off polymer strands into pellets, and as the wear and grooving occurs to the bottom surface of the blades, the gap tends to widen over time. Further, the many various polymers and combinations of additives and/or fillers have different properties and levels of abrasiveness.

For example, it is well known that a high density polyethylene will shear more easily and cleanly than a polypropylene. In fact, many grades of polypropylene are chemically designed to be more resistant to shear and to be tough and more resistant to premature failure for the end use product, such as tear-resistant film. These same properties of toughness, tear-resistance and shear-resistance are also faced during the underwater pelletizing process.

A wide variety of additives such as mineral or glass fillers, such as TiO2, CaCO3, and fiberglass, as examples, are compounded into the polymers, during the processes upstream of the underwater pelletizer. These additives and their percent content can have a significant impact on the rate of wear on the blades, dies and any other components on which they come into contact. The amount of wear or rate of wear can greatly vary from being mildly abrasive to very aggressively abrasive. Therefore, as the cutter blade wears, the gap between the blade cutting surface and the die face surface will grow, and eventually at some point pellet shape and quality will become affected.

It is also known that once the pellet shape or quality changes, then a blade adjustment needs to be made. This is accomplished by moving a cutter shaft, and the cutter hub and cutter blades toward or away from the die face. The cutter shaft can be adjusted manually, as illustrated in U.S. Pat. No. 4,728,276, or can be adjusted by a spring force, as illustrated in U.S. Pat. No. 5,059,103, or it can be adjusted pneumatically or hydraulically which can be controlled by complex programmable logic controllers (PLC's) which adjust based on timing functions, or ampere feedback loops or pressure measurements or all of these, as examples. See published U.S. Patent Application No. US 2004-0009254-A1 for example. The blade adjustment relative to the gap regardless of the methods, manual, spring, pneumatic, or hydraulic most often results in grinding the blades into the die face that is normally constructed of harder, more wear resistant materials, in order to close the gap and to resharpen the blades. This procedure is accomplished while the pelletizer is usually in operation and thus as the gap is closed and blades re-sharpened, then the pellet shape and quality is either maintained as normal or returns to normal.

Also the process of wearing again re-starts/continues and thus the gap begins to grow again. So the process of wear continues to cycle over and over again. Thus the need to adjust the blades periodically in a step by step procedure or rather continuously by means of automation, all contribute to grinding and grooving changes to the die face. Bottom surface areas of the blades basically need to be ground away against the die and groove areas of the die face. This seating procedure is illustrated in FIGS. 14 and 15, once new blades have been seated in relation to the die face condition, then it is usually no longer necessary to seat the blades again until either another different die plate is installed or until after the blades have worn out completely and another new set is installed which will also need to be seated. If the area of contact of the bottom edge 54 of the blades 24 with the die face 16 is reduced, the amount of cutter shaft force necessary to grind away blades 24, which to some extent wear away the die face 16, is directly proportionally reduced. Thus the reduction in grinding forces necessary to help seat the blades and to reduce the die face wear is significant because of less wear on the die face, less power consumed, less wear and tear on the shaft bearing mechanisms, better overall control, less heat build-up in the important metallurgy of the blades, and/or die face construction, and less risk to prematurely breaking the blades and/or their mounting hardware.

As described above in connection with FIGS. 11a-11c, the amount of surface area in contact with the die face has been reduced in the prior art by utilizing a blade mounted parallel to the shaft or perpendicular to the die face, as in FIG. 11c. The only way that the prior art can further reduce the surface area is to make the blades narrower which is limited by the die extrusion hole diameter or by the layout of the various die extrusion holes in the die face. Thus, the blade width is dependent on the die holes. Making the blades thinner is limited by the strength required for the blade, which is effected by a complex mix of variables such as blade length, grinding forces, blade material of construction, etc. In addition, if the blade angle is less than 90°, such as the 49° angle illustrated in FIG. 11a, then there is risk of flexing (bending) and heeling. This risk increases as the angle approaches zero. However, even at 900, the blade is very weak to cantilever forces.

Figure 11D:
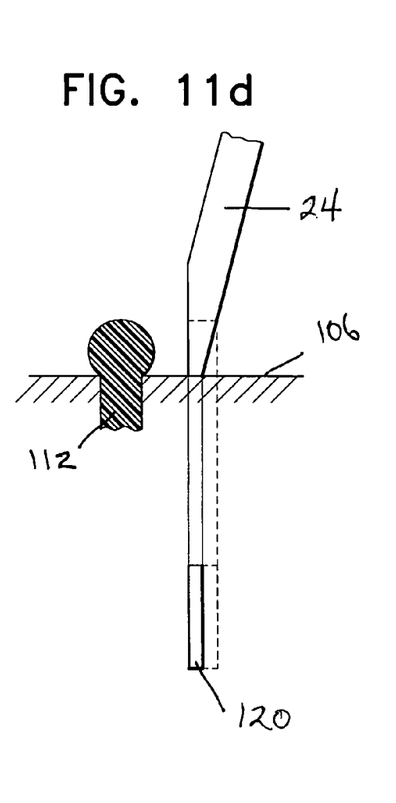

In accordance with the present invention, the front edge of the angled blade is beveled like that illustrated in FIG. 11d. In this way, removing the blade thickness on an angle accomplishes the goal of making a thinner blade with a smaller bottom surface contact area represented by rectangle 120 in FIG. 11d. With the smaller bottom surface contact area, the blade 24 is going to be faster and easier to seat to the die face, with much less force and much less wear on the die face; yet, due to the angle of the blade relative to the direction of rotation and the blade cutter hub, the blade gets the maximum amount of support to prevent bending, flexing, heeling, toeing or even failure by breaking prematurely.

The present invention is also of great benefit to initial start-up with the blades at their absolute thinnest, least bottom surface area as mentioned, easier to decrease the amount of time and forces required to accomplish good seating to further simplify and improve the seating procedure.

Another advantage of the cutter hub and blade assemblies of this invention is their interchangeability with existing cutter hub/blade designs and their capability of use with a very large variation of different polymer resins, plastics and their many various and percent of fillers, waxes, gums, foodstuffs, toners, powder coatings, asphalts, hot melt and pressure sensitive adhesives, rubber and elastomers and other products that are extruded through any face-cut type pelletizing dies for yielding any strand/pellet shapes or sizes. For example, the cutter blades of this invention can be mounted on the cutter hub configuration shown in the aforesaid published U.S. Patent Application No. US 2005-0220920-A1 and vice-versa.

The blades of this invention shear pellets from the strands as cleanly as possible even though some products shear more easily or some with more difficulty than others. Another advantage is extended wear life of the blade and/or the die face.

Figure 12A:
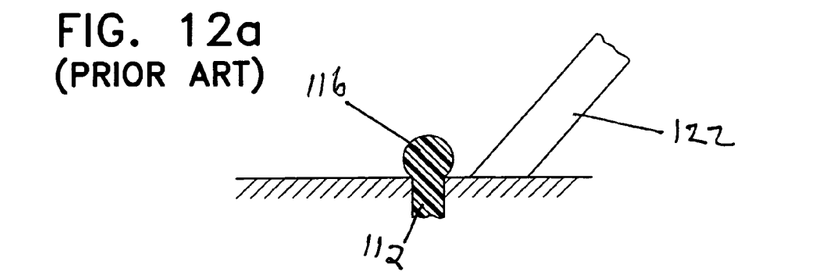
FIGS. 12a-12i illustrate the sequence of a prior art blade cutting pellets from an extruded strand.
Figure 12B:
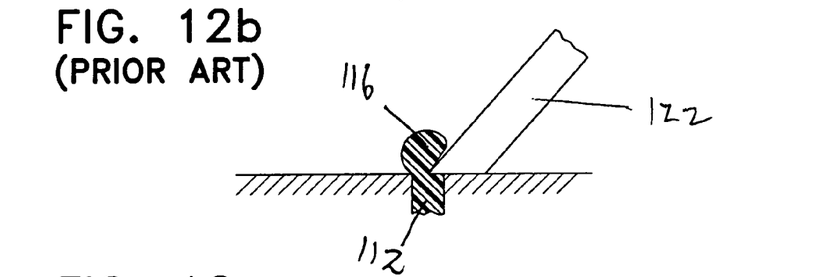
Figure 12C:
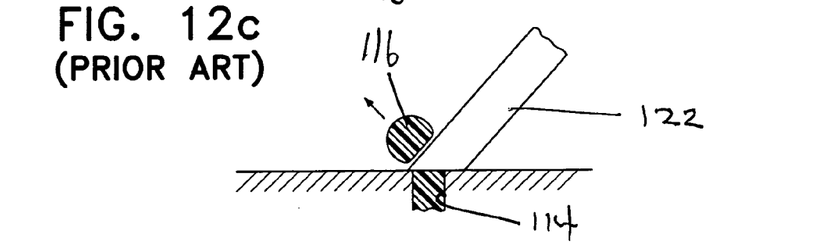
Figure 12D:
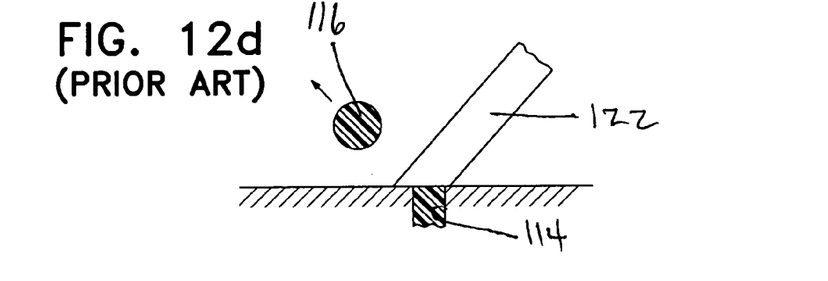

Another result of the present invention is the reduction in the generation of fines. The problem of fines generation in the underwater pelletizing process occurs because some polymers have very high viscosity or are stiff in character, such as rigid PVC. It is known that a thicker blade causes an increase in fines generation than a thinner blade. It is understood if the blades are too thick the bottom surface area of the blades as shown in FIGS. 11*a*-11*c* can completely cover momentarily the die extrusion hole as shown in FIGS. 12*c*-12*d*.

Figure 12E:
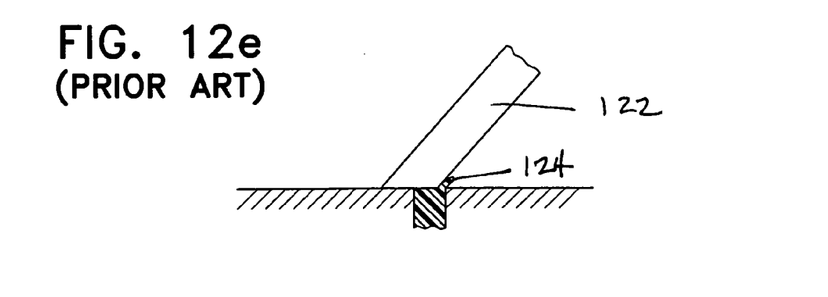
Figure 12F:
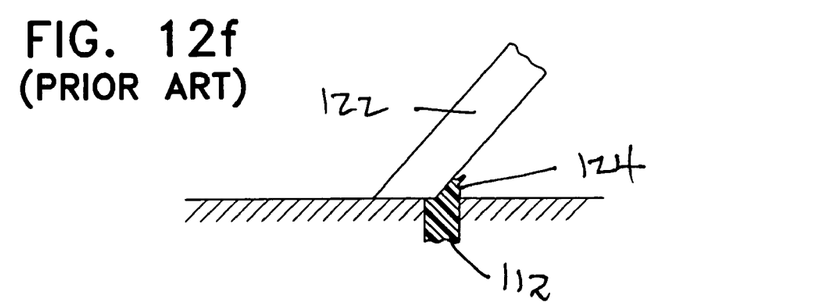
Figure 12G:
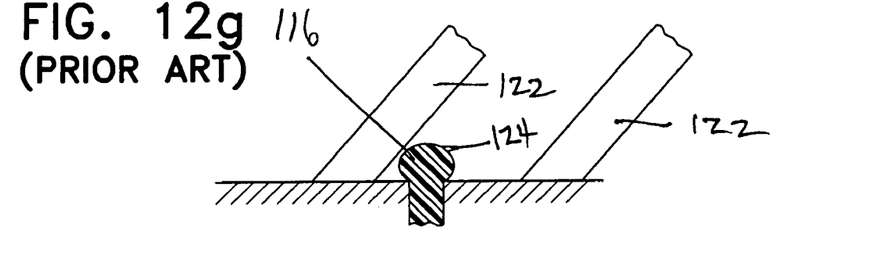
Figure 12H:
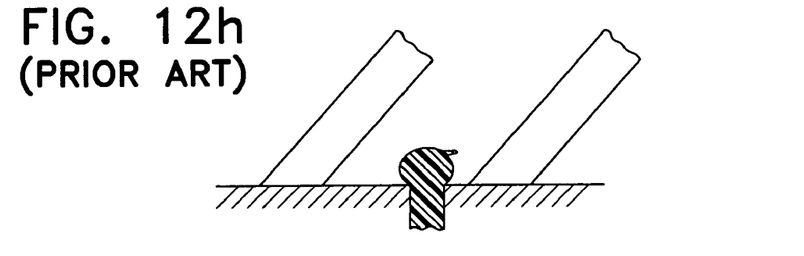
Figure 12I:
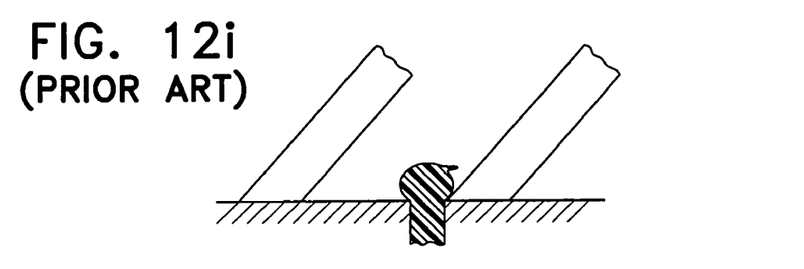
Figure 13A:
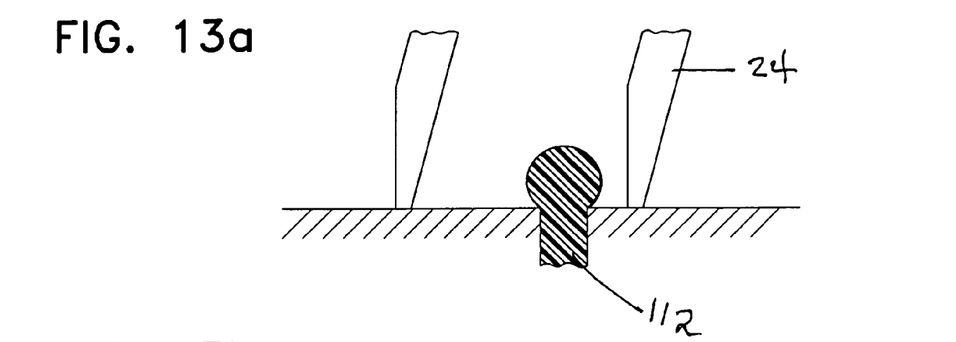
FIGS. 13a-13d illustrate the sequence of the first embodiment cutting blade of the present invention cutting pellets from an extruded strand, similar to FIGS. 12-12i.
Figure 13B:
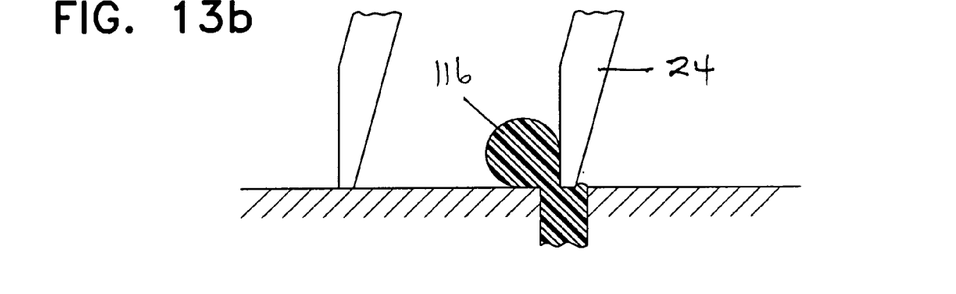
Figure 13C:
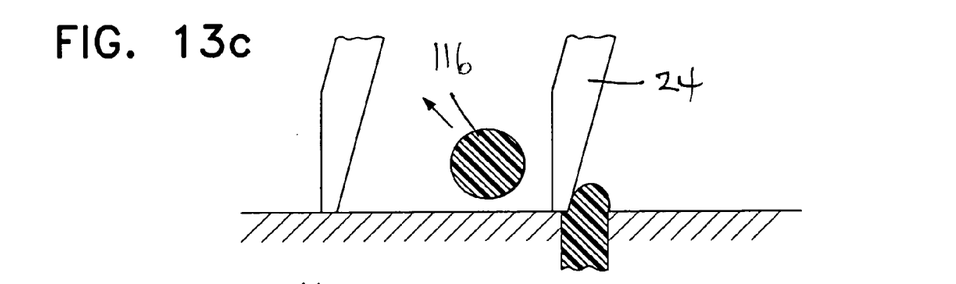
Figure 13D:
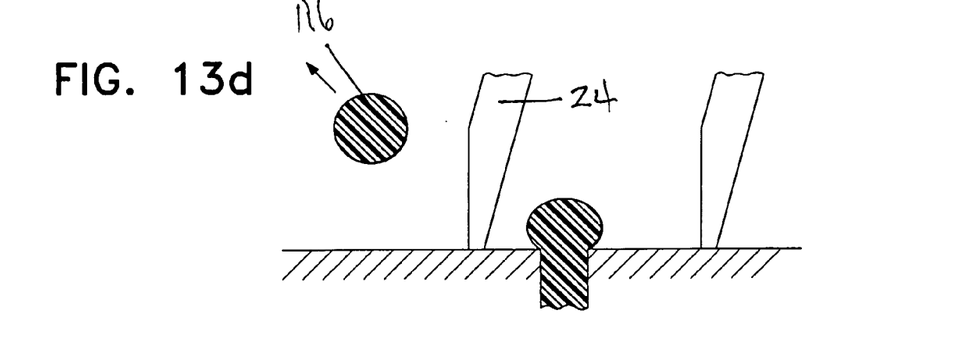

FIGS. 12*a*-12*i* illustrate how cutter blades with a bottom surface contact area thicker than the diameter of the die hole can form "tails" on the pellets which later break off as fines. FIGS. 12*a*-12*d* illustrate the sequence of how blade 122 shears a normal pellet 116. Then with the polymer flow being continuous from the upstream process, complete covering of the die hole 114 (as in FIGS. 12*c* and 12*d*) causes momentary blockage or stoppage of flow. This blockage can in turn build-up pressure in the polymer flow circuit. As the blade 122 continues to pass beyond the hole, the hole as it is being uncovered allows a higher injection velocity just behind the back side of the blade as shown in FIG. 12*e*, thus deforming the flow and resulting pellet shape. The effect on the pellet geometry is that it will have a "tail", "burr" or "skin" 124 that is weakly attached. This tail, burr, or skin 124 can be broken off as the pellet 116 passes further into the water/slurry transport pipelines, and on into a dryer/dewatering unit. These broken off pieces, or fines, will normally stay in the process water loop and will build up over time causing problems such as leaving a residue in the equipment to contaminate other polymer materials being run later and/or cause blockages in the equipment.

The blades of the present invention are designed with a thinner bottom edge to avoid covering completely the vast majority of die extrusion hole diameters that are used for the high viscosity, stiff polymers, as shown in FIGS. 13*a*-13*d*. Thus the risk of fines generations is reduced by the blades of the present invention.

The foregoing description and drawings should be considered as illustrative only of the principles of the invention. As noted, the invention may be configured in a variety of sizes and is not limited to the dimensions illustrated. Numerous applications of the present invention will readily occur to those skilled in the art; therefore, it is not desired to limit the invention to the preferred embodiments or the exact construction and operation shown and described. Rather, all suitable modifications and equivalents may be resorted to, falling within the scope of the invention.

What is claimed is:

1. A cutter hub and blade assembly for a face-cut pelletizer in which molten polymer is extruded as strands through orifices in a die plate which comprises a cutter hub and a plurality of cutter blades mounted on said cutter hub at a steep angle for movement along a die face of the die plate to cut the strands extruded through die holes into pellets, said cutter blades having a beveled leading edge to form a blunt cutting edge which has a surface generally perpendicular to said die face.

2. The assembly as claimed in claim 1, wherein said steep angle is from about 60° to about 79°, preferably about 72° to about 76°.

3. The assembly as claimed in claim 1, wherein said beveled leading edge has a bevel angle of between about 11° and about 30°, preferably between about 14° to about 18°.

4. The assembly as claimed in claim 3, wherein the steep angle is about 75° and said bevel angle is about 15°.

5. The assembly as claimed in claim 1, said cutter blades further comprising a bottom contact surface substantially parallel to and in contact with said die face, which surface has a contact area of at least 25% less than the comparative cross-sectional area of the blade.

6. The assembly as claimed in claim 5, wherein said contact area is about 50% to about 75% less than the comparative cross-sectional area of the blade.

7. The assembly as claimed in claim 5, wherein said bottom surface contact area has a thickness substantially less than a diameter of said die holes.

8. The assembly as claimed in claim 1, wherein said blunt cutting edge has a bottom surface beveled along its trailing edge to form a blunt narrow tip cutting edge for initial contact with said die face.

9. The assembly as claimed in claim 1, wherein said blades include opposed cutting edges formed by opposed beveled surfaces at opposite ends of the blades.

10. A face-cut pelletizer which comprises a die plate with extrusion orifices terminating in a die face, a driven rotary cutter hub supported in opposed relation to said die face, a plurality of cutter blades mounted on said cutter hub and moving in a plane generally parallel to and closely adjacent said die face to cut strands of material extruded through said orifices into pellets, a cutting chamber enclosing said die face, said cutter hub and said cutter blades, said cutter blades having a beveled leading edge to form a blunt cutting edge with a blunt edge angle between about 85° and about 95° to the die face and having an area of contact with the die face less than the area of each orifice to permit continuous passage of extruded material through said orifices.

11. The pelletizer as claimed in claim 10, wherein said cutter blades are mounted on said cutter hub at a steep angle from about 72° to about 76°.

12. The pelletizer as claimed in claim 10, wherein said beveled leading edge has a bevel angle of between about 14° and about 18°.

13. The pelletizer as claimed in claim 12, wherein said blades are mounted on said cutter hub at an angle of about 75° and said bevel angle is about 15°.

14. The pelletizer as claimed in claim 10, wherein said area of contact is at least 25% less than the comparative cross-sectional area of the blade.

15. The pelletizer as claimed in claim 14, wherein said area of contact is about 50% to about 75% less than the comparative cross-sectional area of the blade.

16. The pelletizer as claimed in claim 10, wherein said blunt cutting edge has a bottom surface beveled along its trailing edge to form a blunt narrow tip cutting edge for initial contact with said die face.

17. A cutter blade for mounting on a rotating cutter hub at a steep angle to a die face of a die plate of an underwater pelletizer to sheer strands extruded through die holes in said die plate into pellets, which cutting blade comprises in cross-section a parallelepiped configuration with the leading edge beveled to form a blunt cutting edge surface which extends at least 10% of a length of said blade and extends generally perpendicular to said die face.

18. The cutter blade as claimed in claim 17, further comprising a bottom contact surface substantially parallel to and in contact with said die face, which surface has a contact area at least 25% less than the comparative cross-sectional area of the blade.

19. The cutter blade as claimed in claim 17, further comprising a bottom surface beveled along its trailing edge to form a blunt narrow tip cutting edge for initial contact with said die face.

20. The cutter blade as claimed in claim 17, wherein said bottom surface contact area has a thickness substantially less than a diameter of said die holes.

* * * * *